US006180754B1

(12) United States Patent
Stutts et al.

(10) Patent No.: US 6,180,754 B1
(45) Date of Patent: Jan. 30, 2001

(54) PROCESS FOR PRODUCING CROSS-LINKED POLYALLYLAMINE POLYMER

(75) Inventors: Kenneth J. Stutts; Russ L. Kiekhaefer, both of Midland, MI (US)

(73) Assignee: The Dow Chemical Company, Midland, MI (US)

( * ) Notice: Under 35 U.S.C. 154(b), the term of this patent shall be extended for 0 days.

(21) Appl. No.: 09/390,498

(22) Filed: Sep. 3, 1999

(51) Int. Cl.$^7$ .................. C08G 73/00; C08G 65/00; C08F 12/28; C08F 26/04; C08J 3/00
(52) U.S. Cl. .................. 528/422; 528/480; 528/482; 528/488; 528/495; 528/499; 528/502 R; 528/502 A; 528/502 C; 525/328.2; 525/359.1; 525/359.3; 525/359.5; 525/366; 526/310
(58) Field of Search .................. 526/310; 525/328.2, 525/359.1, 359.3, 359.5, 366; 528/422, 480, 482, 488, 495, 499, 502 R, 502 A, 502 C

(56) References Cited

U.S. PATENT DOCUMENTS

| 4,528,347 | 7/1985 | Harada et al. ............ 526/219 |
| 4,540,760 | * 9/1985 | Harada et al. ............ 526/211 |
| 4,605,701 | 8/1986 | Harada et al. ............ 525/107 |
| 4,885,247 | 12/1989 | Datta ...................... 435/139 |
| 5,496,545 | 3/1996 | Holmes-Farley et al. ...... 424/78.11 |
| 5,607,669 | 3/1997 | Mandeville, III et al. ...... 424/78.12 |
| 5,618,530 | 4/1997 | Mandeville, III et al. ...... 424/78.12 |
| 5,679,717 | 10/1997 | Mandeville, III et al. ...... 514/742 |
| 5,693,675 | 12/1997 | Mandeville, III et al. ...... 514/742 |
| 5,702,696 | 12/1997 | Mandeville, III et al. ...... 424/78.12 |

FOREIGN PATENT DOCUMENTS

| 4227019 A1 | 2/1994 | (DE) . |
| 732352 A1 | 9/1996 | (EP) . |
| 05244915 | 9/1993 | (JP) . |
| 07309766 | 11/1995 | (JP) . |
| WO 96/21454 | 7/1996 | (WO) . |
| WO 98/57652 | 12/1998 | (WO) . |

OTHER PUBLICATIONS

Encyclopedia of Polymer Science and Engineering, 1988, vol. 8, pp. 341–393.
Chang, J. App. Electrochem, 9, 731–736 (1979).
J. D. McLean, V. A. Stenger, R. E. Reim, M. W. Long and T. A. Hiller, Anal. Chem., 50, 1309 (1978).
Encyclopedia of Polymer Science and Engineering, 1988, vol. 17, pp. 75–107.
Voss, J. Membrane Sci., 27, 165–171 (1986).
Hwang and Kammermeyer, Techniques of Chemistry, Wiley, vol. VII, 494 (1975).

\* cited by examiner

Primary Examiner—P. Hampton-Hightower

(57) ABSTRACT

Disclosed are reduced salt polyallylamine polymer compositions, a process for producing a cross-linked polyallylamine polymer from a reduced salt, aqueous solution of a polyallylamine polymer and a multifunctional cross-linking agent and to cross-linked polyallylamine polymer compositions produced thereby.

21 Claims, 2 Drawing Sheets

PROCESS FOR PRODUCING CROSS-LINKED POLYALLYLAMINE POLYMER

FIELD OF THE INVENTION

This invention relates to reduced salt polyallylamine polymer compositions, a process for producing a cross-linked polyallylamine polymer from a reduced salt, aqueous solution of a polyallylamine polymer and a multifunctional cross-linking agent and to cross-linked polyallylamine polymer compositions produced thereby.

BACKGROUND OF THE INVENTION

Cross-linked polyallylamine polymers have found many therapeutic applications. See for example, WO 98/57652, JP 07309766-A and U.S. Pat. Nos. 5,618,530, 5,679,717, 5,693,675 and 5,607,669 for reducing blood cholesterol levels by reducing reabsorption of bile acids, U.S. Pat. No. 5,702,696 for decreasing the absorption of dietary iron from the gastrointestinal track, and WO 96/21454 and U.S. Pat. No. 5,496,545 for removing phosphate from the gastrointestinal track. Further, JP 05244915 discloses the use of cross-linked polyamine polymers as a food preservative.

Methods to produce cross-linked polyamine polymers are known. See for example, the references cited hereinabove and U.S. Pat. No. 4,605,701, DE 4227019 A1 and EP 732352 A1. These references disclose cross-linking the polyallylamine polymer by reacting the polymer with a suitable cross-linking agent in aqueous caustic solution or an aqueous caustic solution and immiscible solvent mixture.

The existing methods to produce cross-linked polyamine polymers create difficult and costly handling and cleanup procedures, especially in an industrial production process. For example in U.S. Pat. Nos. 5,618,530, 5,679,717, 5,693,675, 5,702,696 and 5,607,669 the cross-linked polyallylamine forms a continuous mass within the reaction vessel after it congeals which is impractical on a large scale. Further, when the cross-linking reaction occurs in a basic aqueous solution the removal of undesirable impurities, such as salts, e.g., sodium chloride, as well as unreacted allylamine monomer, low molecular weight polyallylamine polymer, low molecular weight compounds from initiator degradation during and after the free-radical polymerization of the allylamine monomer, solvents, etc., is very complicated as it must be performed on the solid, insoluble, cross-linked polyallylamine polymer. Moreover, when using a basic aqueous solution and dispersion solvent mixture, such as disclosed in WO 98/57652, the solvent, e.g., acetonitrile, must be reclaimed or disposed of. The present invention addresses these problems and gives a more practical solution to them.

SUMMARY OF THE INVENTION

Accordingly, the present invention is directed to a process for producing a cross-linked polyallylamine polymer comprising the steps of reacting a reduced salt, aqueous solution of a polyallylamine polymer with a multifunctional cross-linking agent, preferably epichlorohydrin, to give a cross-linked polyallylamine polymer.

One embodiment of the present invention comprises the step of neutralizing an aqueous solution of a polyallylamine acid salt polymer, preferably polyallylamine hydrochloride polymer, by ion exchange or electrodeionization, to give a reduced salt, aqueous solution of polyallylamine polymer.

In a further embodiment, the present invention comprises the step of nanofiltering or ultrafiltering a neutralized, aqueous solution of a polyallylamine polymer to yield a reduced salt, aqueous solution of polyallylamine polymer.

In yet a further embodiment, the present invention involves the composition of a reduced salt, aqueous solution of polyallylamine polymer produced by the foregoing steps.

In yet a further embodiment, the present invention comprises the step of concentrating a reduced salt, aqueous solution of polyallylamine polymer prior to cross-linking.

In yet a further embodiment, the present invention comprises the step of washing the cross-linked polyallylamine polymer with an alcohol or alcohol/water solution.

In yet a further embodiment, the present invention comprises the step of drying the cross-linked polyallylamine polymer.

In yet a further embodiment, the present invention involves the use of a reactor designed for high viscosity processing, preferably a LIST reactor, in the cross-linking and/or drying steps.

In yet a further embodiment, the present invention involves compositions of cross-linked polyallylamine polymers produced by the foregoing process.

DETAILED DESCRIPTION OF THE EMBODIMENTS

Figure 1:
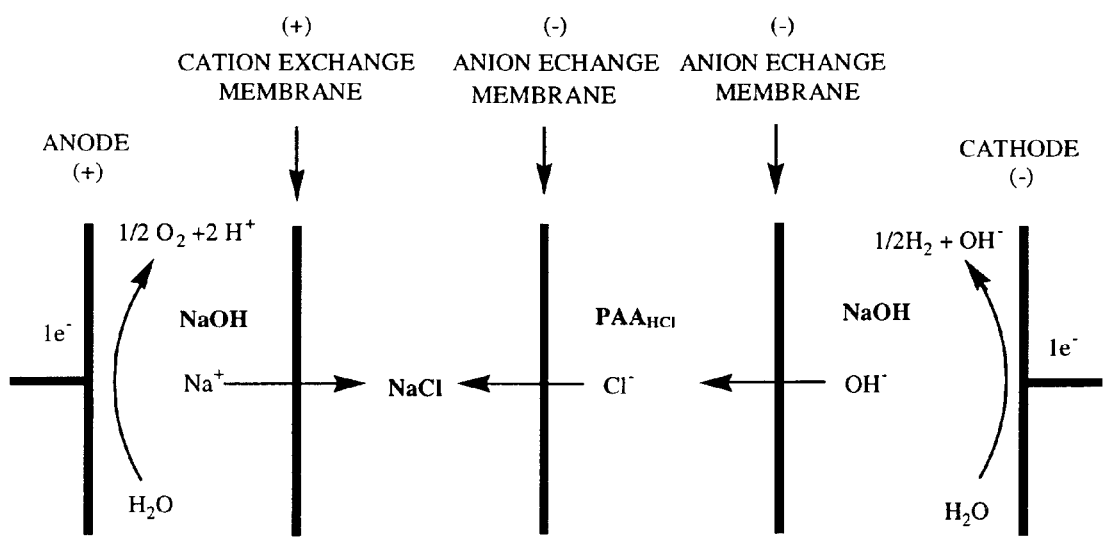
FIG. 1 is a schematic of an electrodeionization cell configuration for neutralizing polyallylamine hydrochloride by the consumption of sodium hydroxide.

The present invention provides a process for producing a cross-linked, water-insoluble but swellable polyallylamine polymer. The process comprises subjecting a portion of the amino groups present in a reduced salt, aqueous solution of polyallylamine polymer to a cross-linking reaction with a compound having, in its molecule, at least two functional groups reactive with primary amino groups, as well as providing said cross-linked polyallylamine polymers.

The polyallylamine acid salt polymer used in the present invention is well known from references cited hereinabove and U.S. Pat. No. 4,528,347, which is incorporated by reference herein. Generally, monoallylamine is polymerized as a monomer inorganic acid salt (e.g., hydrochloride, sulfate, etc.) of monoallylamine in the presence of an azo type radical initiator. The polyallylamine acid salt polymer used in the invention typically has a molecular weight ("$M_w$") greater than about 2,000 and more preferably greater than about 20,000. The polyallylamine polymer used in the invention typically has a molecular weight less than or equal to about 200,000 and more preferably less than or equal to about 100,000. Polyallylamine hydrochloride polymer, the polymerization product from the hydrochloric acid salt of monoallylamine, is a preferred polyallylamine acid salt polymer.

Preferably, the polyallylamine acid salt polymer is neutralized prior to cross-linking. The neutralized polyallylamine polymer is sometimes referred to as polyallylamine polymer. The aqueous solution of polyallylamine polymer used in the invention is prepared by dissolving a polyallylamine acid salt polymer obtained by a process mentioned hereinabove into water or other suitable solvent. Neutralization can be accomplished with any suitable base such as ammonium hydroxide, preferably sodium hydroxide, by ion exchange, electrodeionization or by other suitable methods.

A complete neutralization of the polyallylamine acid salt polymer prior to cross-linking is not always necessary. Depending on its intended use, a partial neutralization is also allowable and often desirable to give the desired level of cross-linking, pH, properties and efficacy for the cross-linked polyallylamine polymer. Preferably, the polyallylamine acid salt polymer is neutralized whereby at least about 50 percent, more preferably at least about 60 percent, even more preferably at least about 65 percent, even more preferably at least about 70 percent, and most preferably at least about 71 percent of the amino groups in the polyallylamine acid salt polymer are neutralized. Preferably, the polyallylamine acid salt polymer is neutralized whereby about 100 percent, more preferably no more than about 90 percent, more preferably no more than about 80 percent, even more preferably no more than about 75 percent, even more preferably no more than about 73 percent, and most preferably about 72 percent of the amino groups in the polyallylamine acid salt polymer are neutralized.

Neutralization of a polyallylamine acid salt polymer with a base, e.g., polyallylamine hydrochloride with sodium hydroxide, especially on a commercial scale, results in formation of copious quantities of the inorganic acid salt, e.g., sodium chloride. Salt, such as sodium chloride, is undesirable in the final cross-linked polyallylamine, especially polyallylamine for use in therapeutic applications. In the present invention, removal of salt, such as sodium chloride, prior to cross-linking eliminates the arduous and costly process of removing the salt from the cross-linked polyallylamine.

The aqueous solution of polyallylamine polymer cross-linked in the present invention, is a reduced salt, aqueous solution of polyallylamine polymer. Cross-linking a reduced salt, aqueous solution of polyallylamine facilitates handling, cleanup and isolation of the cross-linked polyallylamine polymer. Preferably, the reduced salt, aqueous solution of polyallylamine polymer has reduced levels of impurities such as unreacted allylamine monomer, low molecular weight polyallylamine polymer, low molecular weight compounds from initiator degradation during and after the free-radical polymerization of the allylamine monomer, and solvents.

Neutralization of an aqueous solution of polyallylamine acid salt by ion exchange or electrodeionization provides a reduced salt, aqueous solution of polyallylamine polymer directly from the polyallylamine hydrochloride. Neutralization by ion exchange is well known. A good discussion of ion exchange polymers and applications is contained in *Encyclopedia of Polymer Science and Engineering*, 1988, Volume 8, pp. 341–393, the entire disclosure of which is incorporated herein by reference.

Preferably, neutralization is accomplished by electrodeionization ("EDI") sometimes called electrodialysis. Electrodeionization can be performed as a batchwise operation or as a continuous process. Electrodeionization comprises the use of an electromotive force ("EMF") to cause the migration of ions through ion selective membranes in order to neutralize (or desalt) a desired solution. For example, desalination of water and the concomitant production of salt are well-known applications of electrodeionization. Another application is the deacidification (sweetening) of citrus juices like orange juice (Voss, J. Membrane Sci., 27, 165–171 (1986) and Hwang and Kammermeyer, Techniques of Chemistry, Wiley, vol VII, 494 (1975)). Another application of electrodeionization is the conversion of polyammonium salts into amines as demonstrated for ethylenediamine dihydrochloride to ethylenediamine (Chang, J. App. Electrochem., 9, 731–736 (1979)). Yet another example of organic separation technology is disclosed in U.S. Pat. No. 4,885,247 for the recovery and purification of lactic acid from lactate in fermentation broth. In the deacidification of citrus juices, production of amines, and purification of lactic acid, the organic anion traverses the membrane degrading the current efficiency at which the process runs. Preferably, the electrodeionization process of the present invention retains the polymeric amine between two anion exchange membranes. The EMF causes migration of chloride ions out of one of the membranes and hydroxide ion in through the other membrane to give a net neutralization of the polyallylamine hydrochloride (cell configuration exemplified in FIG. 1). Other cell configurations (e.g., Chang) with water splitting membranes are possible in which acid would be produced instead of consumption of sodium hydroxide. In either configuration, electrodeionization provides a high pH, polyallylamine polymer solution with a reduced salt concentration.

Neutralization of an aqueous solution of polyallylamine hydrochloride polymer by a suitable base (e.g., lithium hydroxide, potassium hydroxide, sodium hydroxide, etc.) provides an aqueous solution of polyallylamine polymer with high levels of salt (e.g., sodium chloride). However, means to remove salt, for example, ion exchange, dialysis, nanofiltration or ultrafiltration may be used to provide the reduced salt, aqueous solution of polyallylamine polymer of the present invention.

Preferably, reducing the level of salt in polyallylamine polymer to provide a reduced salt polyallylamine polymer is done by ultrafiltration. Ultrafiltration is a pressure driven filtration separation occurring on a molecular scale and is well known in the art. Typically, a process fluid containing dissolved and/or suspended material contacts one side of a porous membrane. A pressure gradient is applied across the membrane. The liquid, including small dissolved molecules (e.g., unreacted allylamine and low molecular weight polyallylamine polymer) and ions (e.g., the salt) are forced through the pores. Colloids, suspended solids, and large dissolved molecules (e.g., the polyallylamine polymer) are retained by sieving. A good discussion of ultrafiltration is contained in *Encyclopedia of Polymer Science and Engineering*, 1988, Volume 17, pp. 75–107, the entire disclosure of which is incorporated herein by reference.

Salt content can be determined experimentally for the polyallylamine polymer and/or aqueous solution by any known analytical procedure, such as neutron activation or ion selective electrochemistry. Further, salt content can be determined by theoretical calculations based on the mass balance of reactants and products. Further, when neutralized by electrodeionization and/or ultrafiltration salt content can be determined by known operating conditions of the electrodeionization and ultrafiltration processes. For example, for electrodeionization the salt concentration is determined by the ion selectivity of the membrane as stated by the manufacturer; for ultrafiltration in a con-add mode, the concentration of the salt is a decreasing exponential function proportional to the number of reactor volumes used to elute the system (see Encyclopedia of Polymer Science, Vol. 17, page 97, equation (13)).

If salt is present in the reduced salt, aqueous solution of polyallylamine polymer of the present invention it is preferably present in an amount less than the theoretical amount produced from the (partial) neutralization of the amino groups in the polyallylamine acid salt polymer, for example 100 percent neutralization of polyallylamine hydrochloride with sodium hydroxide would yield about 51 percent sodium chloride based on the weight of the neutralized polyallylamine polymer. Following neutralization, but prior to cross-linking, the amount of salt in the aqueous solution of polyallylamine polymer is less than or equal to about 51 percent based on the weight of the (partially) neutralized polyallylamine polymer, preferably less than or equal to about 45 percent, more preferably less than or equal to about 35 percent, more preferably less than or equal to about 25 percent, more preferably less than or equal to about 15 percent, more preferably less than or equal to about 10 percent, more preferably less than or equal to about 5 percent, even more preferably less than or equal to about 3 percent, even more preferably less than or equal to about 1 percent, even more preferably less than or equal to about 0.5 percent, even more preferably less than or equal to about 0.3 percent, and most preferably less than or equal to about 0.1 percent based on the weight of the (partially) neutralized polyallylamine polymer.

Further, based on the operating conditions of the electrodeionizing device, such as the membrane permeability and/or the ultrafiltration device, such as the molecular weight cutoff of the membrane, electrodeionization and/or ultrafiltration can further remove low molecular weight impurities from aqueous solutions of polyallylamine polymer. Examples of low molecular weight impurities are allylamine monomer, initiator degradation products, such as tetramethylsuccinamide ("TMS"), and low molecular weight fractions of the polyallylamine polymer which are statistically less likely to cross-link to form the desirable water insoluble product.

Preferably, the reduced salt, aqueous solution of polyallylamine polymer is concentrated following neutralization and prior to cross-linking by any known means in the art such as concentrative ultrafiltration or flash evaporation under vacuum at elevated temperatures. Preferably the reduced salt, aqueous solution contains at least about 1.5 milliequivalents polyallylamine polymer per gram of solution ("meq/g"), more preferably at least about 2.0 meq/g, even more preferably at least about 2.5 meq/g, even more preferably at least about 3.0 meq/g, even more preferably at least about 3.5 meq/g, even more preferably at least about 4.0 meq/g, even most preferably at least about 4.5 meq/g polyallylamine polymer. Preferably the reduced salt, aqueous solution contains less than or equal to about 9.0 meq polyallylamine polymer per gram of solution, more preferably less than or equal to about 8.5 meq/g, more preferably less than or equal to about 8.0 meq/g, more preferably less than or equal to about 7.5 meq/g, more preferably less than or equal to about 7.0 meq/g, more preferably less than or equal to about 6.5 meq/g, and most preferably less than or equal to about 6.0 meq/g polyallylamine polymer.

The cross-linking agent and reduced salt, aqueous solution of the polyallylamine, preferably concentrated, reduced salt, aqueous solution of the polyallylamine are mixed together, preferably at about room temperature and allowed to react. Examples of suitable cross-linking agents include acrylol chloride, epichlorohydrin, butanedioldiglycidyl ether, preferably 1,4 butanedioldiglycidyl ether, ethanedioldiglycidyl ether preferably 1,2 ethanedioldiglycidyl ether, 1,3-dichloropropane, 1,2-dichloroethane, 1,3-dibromopropane, 1,2-dibromoethane, succinyl dichloride, dimethylsuccinate, toluene diisocyanate, and pyromellitic dianhydride. A preferred cross-linking agent is epichlorohydrin because of its low cost. Epichlorohydrin is also advantageous because of its low molecular weight and hydrophilic nature, maintaining the water swellability and phosphate-binding efficacy of the polyallylamine polymer gel.

When used in therapeutic applications, such as sequestration of bile acids or the binding of phosphate in the gastrointestinal tract, the level of cross-linking makes the polymer insoluble and substantially resistant to absorption and degradation. Preferably, the cross-linking agent is present in an amount from about 0.1 weight percent, more preferably from about 0.5 weight percent, even more preferably from about 1.0 weight percent, even more preferably from about 2.0 weight percent and most preferably from about 5.0 weight percent, weight percent based on the combined weight of (partially) neutralized polyallylamine polymer and cross-linking agent. Typically, the cross-linking agent is present in an amount less than or equal to about 75 weight percent, more preferably in an amount less than or equal to about 50 weight percent, even more preferably in an amount less than or equal to about 25 weight percent, even more preferably in an amount less than or equal to about 20 weight percent and most preferably in an amount less than or equal to about 10 weight percent, weight percent based on the combined weight of (partially) neutralized polyallylamine polymer and cross-linking agent.

The cross-linking reaction can be run in any suitable vessel or reactor. A preferred reactor is one in which the reaction can be run batch-wise or in a continuous fashion. More preferred is a reactor designed for high viscosity processing which has agitation means capable of mixing the reactants prior to gelation and breaking the gel into small pieces or crumb after gelation. An example of a preferred reactor designed for high viscosity processing is a LIST-DISCOTHERM B manufactured by LIST Inc. The LIST-DISCOTHERM B can be supplied for batch or continuous operation. It is particularly useful for thermal processes such as drying or reactions, where mixing or kneading is necessary to process viscous, pasty, crusting or gelatinous materials such as cross-linked polyallylamine polymer. The basic unit consists of a horizontal, cylindrical housing, and a concentric agitator shaft with disc elements perpendicular to the axis carrying peripheral mixing/kneading bars. Stationary hook-shaped bars set in the shell interact with, and clean, the shaft and disk elements as they rotate. Shell, shaft, and disc elements, all of which contribute to heat transfer can be heated or cooled. The unit generally operates with a fill level of 60 to 75 percent reactor capacity. Typical shaft speeds range from 5 to 100 rotations per minute ("rpm") with high installed torque. The combined effect of the intensive mixing and kneading action and the self cleaning of the heat exchange surfaces results in high heat and mass transfer rates. In batch units the mixing bars are arranged to perform optional mixing. For continuous operation, the arrangement of the internal geometry provides a forward plug flow movement of the material. However, the axial conveying rate is nearly independent of agitator rotation speed, making it possible to operate at high agitator rotation speeds optimizing heat and mass transfer. Furthermore, the positioning of the disc elements enables the processing of liquid feed stocks directly through to a solid free flowing material without recycling of dry product. The unique design of the LIST reactor eliminates the formation of a single, continuous, congealed mass. As gelation occurs, the self-wiping concentric agitator shaft and disc elements create easy to handle clumps of gel.

The mixture of cross-linking agent and the reduced salt, aqueous solution of the polyallylamine is agitated, preferably between about 60 to about 100 rpm, more preferably about 80 rpm until the mixture has gelled. Once the mixture has gelled, the reaction is allowed to continue or sometimes referred to as cure. During curing, the rate of agitation is decreased, intermittent or discontinued to minimize shear degradation of the cross-linked polymer, preferably agitation is continuous and/or intermittent (on/off) at about 20 rpm. Preferably during curing the reaction temperature is increased, for example to between about 70 to 80° C., for an extended period, for example from 5 to 20 hours.

Unreacted or minimally reacted starting materials are sometimes referred to as soluble oligomers. Shear degraded cross-linked polyallylamine polymer is another source of soluble oligomers. Cross-linked polyallylamine polymer produced from conventional, i.e., high salt, aqueous solution of polyallylamine is particularly susceptible to shear degradation resulting from the arduous clean-up procedures required to remove salt from the polymer. Soluble oligomers are undesirable in the final cross-linked polyallylamine polymer. Preferably, the cross-linked polyallylamine polymer is washed to remove undesirable soluble oligomers. Any medium may be used as long as the cross-linked polyallylamine is not soluble in it while the soluble oligomers are. Preferably, water, one or more alcohols such as methanol, ethanol, propanol, isopropyl alcohol, and the like, and mixtures of one or more of these are used. The cross-linked polyallylamine polymer may be washed one or more times to reduce the soluble oligomers to a desired level. If soluble oligomers are present in the final cross-linked polyallylamine polymer, preferably they are present in an amount less than about 1 weight percent, more preferably in an amount less than about 0.8 weight percent, more preferably in an amount less than about 0.6 weight percent, and most preferably in an amount less than about 0.5 weight percent based on the weight of the cross-linked polyallylamine polymer.

The cross-linked polyallylamine polymer is separated from the aqueous solution and dried by any suitable means. For example, the cross-linked polyallylamine polymer can be separated from the aqueous solution by filtration or centrifugation then dried in a vacuum oven or a LIST dryer. Preferably, the cross-linked polyallylamine polymer is dried under vacuum at a temperature less than about 80° C. The dried cross-linked polyallylamine polymer is preferably ground by any suitable method, for example mortar and pestle, a Retsch Mill, or a FitzMill.

To illustrate the practice of this invention, examples of preferred embodiments are set forth below. However, these examples do not in any manner restrict the scope of this invention.

EXAMPLES

A summary of neutralization and/or ultrafiltration conditions for polyallylamine hydrochloride polymer for Comparative Examples A to O and Examples 1 to 15 are given in Table 1 below. In Table 1:

"$PAA_{HCl}$" is a 50 weight percent aqueous solution of polyallylamine hydrochloride polymer having an average molecular weight of about 10,000 to about 30,000, about 93.6 grams per mol (g/mol) as the HCl salt, and containing monomer allylamine in an amount of about 5 percent by weight based on the polyallylamine hydrochloride polymer, polyallylamine polymers are available commercially from Aldrich Chemical Company, Inc., 1001 West Saint Paul Avenue, Milwaukee, Wis., USA;

"$EDI_1$" is the electrodeionization process used to neutralize the polyallylamine hydrochloride polymer in a lab cell constructed out of a graphite anode and a nickel cathode with an Ionac MA3475 anion exchange membrane sandwiched between rubber gaskets to form a two compartment flow through cell with an active area of about 5 square centimeters ($cm^2$). The anolyte was made of 25 percent sodium formate ("formate") in water. The catholyte was made from a commercially available 50% $PAA_{HCl}$ aqueous solution diluted with water. The $PAA_{HCl}$ was neutralized to convert about 72 weight percent of the amine hydrochlorides to free amines. The electrodeionizations were run under controlled current conditions, sometimes referred to as galvanostatic conditions. Depending on desired time of reaction, the controlled current ("I") was kept constant (e.g., 0.9 milliamp ("mA")) or varied over the course of the neutralization (e.g., 0.9 to 0.6 mA). Calculation of the charge to neutralize the $PAA_{HCl}$ to its 72 percent endpoint utilized Faraday's law:

$$Q = 0.72 * nFmols$$

where:

Q is the quantity of electrical charge (Coulombs) to neutralize the $PAA_{HCl}$, n is the equivalency/mol (eq/mol) of the material being neutralized (n=1 for $PAA_{HCl}$), mols are the number of mols being neutralized, and F is Faraday's constant (96485 C/mol).

"$UF_1$" ultrafiltration was performed using one of the below mentioned ultrafiltration membranes in an Amicon 8400 magnetically stirred cell available from Gelman Scientific Co., Ann Arbor, Mich., with an applied pressure of about 50 pounds per square inch ("psi"). Each ultrafiltration step comprised diluting the aqueous polyallylamine polymer with water to a volume of about 350 ml (initial volume, "$V_I$") and filtering the solution until about 60 ml of solution (final volume, "$V_F$"), or retenate, remained. The concentration factor is $V_I/V_F$.

"YM10" is an Amicon YM10 ultrafiltration membrane commercially available from Gelman having a 10,000 molecular weight ($M_w$) cutoff;

"YM30" is an Amicon YM30 ultrafiltration membrane commercially available from Gelman having a 30,000 $M_w$ cutoff;

"PW" is an OSM-PW ultrafiltration membrane commercially available from Osmonics having a 10,000 $M_w$ cutoff;

"MX50" is a high flow OSM-MX50 ultrafiltration membrane commercially available from Osmonics having a 10,000 $M_w$ cutoff;

"GM" is a DESAL-GM ultrafiltration membrane commercially available from Osmonics having an 8,000 $M_w$ cutoff;

"Flash" concentration of the reduced salt, aqueous solution of polyallylamine polymer ("PAA") prepared by EDI and/or UF was achieved by flash evaporation under vacuum at an elevated temperature;

"% Solids" was determined on a Mettler LJ16 Moisture Analyzer at 120° C. and is the percent solids in the final concentration of the reduced salt, aqueous solution of PAA prepared by EDI and/or UF following flash evaporation;

Sodium chloride content of the polyallylamine polymer ("$NaCl_{PAA}$") was calculated for the aqueous solution of the polyallylamine polymer based on the mass balance of reactants and products and, when neutralized by electrodeionization and/or ultrafiltered, by known operating conditions of the electrodeionization and ultrafiltration processes and is expressed as weight percent based on weight of PAA;

The polyallylamine polymer concentrations, epichlorohydrin amounts, and reaction conditions to cross-link the polyallylamine polymer and properties of the resulting cross-linked polyallylamine polymer of Examples 1 to 15 and Comparative Examples A to O are given in Table 2 below. In Table 2:

"[PAA]" is the concentration of the polyallylamine polymer given in milliequivalents (meq) of amine per gram of aqueous solution. The equivalent weight amine is equal to the molecular weight of the amine containing repeating unit in the polymer (i.e., allylamine/allylamine hydrochloride molecule). Allylamine has a $M_w$ of 57.1 and allylamine hydrochloride has a $M_w$ of 93.6 thus, 1 meq/g amine of a 72 percent neutralized PAA aqueous solution equals 0.067 g PAA/g solution:

$$[(0.72*57)+(0.28*93.5)]/1000=0.067;$$

"EPI" is 99 percent epichlorohydrin commercially available from Aldrich and Acros; and Cross-linked polyallylamine polymer ("$PAA_x$") samples were ground to a powder by either a mortar and pestle ("M&P") or in a four inch Retsch mill ("Retsch").

The following analytical procedures were run on the cross-linked polyallylamine polymers and the results are summarized in Table 3:

Swell is determined by placing 0.1 g of dry polyallylamine polymer into a two piece centrifuge tube and stirring with 5 ml of water for two hours. Thereafter the slurry is centrifuged and the resultant gel mass weighed to yield swell:

Swell=(mass final−mass initial)/mass initial.

The centrifugate (extract) from the swell is used for the determination of both soluble oligomers and sodium chloride concentration.

Soluble oligomers (SO) are determined by a modification of the method published by McLean (J. D. McLean, V. A. Stenger, R. E. Reim, M. W. Long and T. A. Hiller, Anal. Chem., 50, 1309 (1978). A portion of the extract is derivatized with formaldehyde and then determined polarographically by the reduction of the Schiff's base and compared to a spiked sample.

Sodium chloride in the cross-linked polyallylamine polymer ("$NaCl_x$") is determined for a portion of the extract via analysis with a sodium ion selective electrode.

Phosphate binding capacity ("$PO_4$") is determined by a method similar to that published in U.S. Pat. No. 5,496,545 with the exception that detection was by chromatographic rather than spectrophotopmetric techniques.

Comparative Examples A to F 250 g of polyallylamine hydrochloride polymer solution was diluted with 337 g of water in a 1000 milliliter (ml) vessel. The mixture was stirred and the pH adjusted by the addition of 76.5 g of a 50 weight percent aqueous solution of sodium hydroxide to convert about 72 weight percent of the amine hydrochlorides to free amines. The resulting mixture was cooled to room temperature and the pH of the solution was determined to be 10.2. To each of six 120 ml glass vessels (Comparative Examples A to F) was added 66.4 g (134 meq) of the partially neutralized, aqueous solution of polyallylamine polymer. To each vessel the epichlorohydrin cross-linking agent was added all at once with stirring. The resulting mixtures were stirred until they gelled. The vessels were capped and the reactions were allowed to cure for 15 hours at room temperature ("rt"). The gels were dried under vacuum at 90° C. for 24 hours. After cooling, the solids were ground with mortar and pestle.

Comparative Examples G to N 250 g of polyallylamine hydrochloride polymer solution was added to a 500 ml vessel. The mixture was stirred and the pH adjusted by the addition of 76.5 g of a 50 weight percent aqueous solution of sodium hydroxide to convert about 72 weight percent of the amine hydrochlorides to free amines. The resulting mixture was cooled to room temperature and the pH of the solution was determined to be 10.1. To each of eight 120 ml glass vessels was added 37.7 g (134 meq) of the partially neutralized, aqueous solution of polyallylamine polymer and diluted with water to the desired concentrations (Comparative Examples G to N). To each vessel the epichlorohydrin cross-linking agent was added all at once with stirring. The resulting mixtures were stirred until they gelled. Examples G to J were allowed to cure capped for 15 hours at room temperature. Examples K to N were allowed to cure capped for 15 hours at 70° C. The gels were dried under vacuum at 90° C. for 71 hours. After cooling, the solids were ground with mortar and pestle.

Comparative Example O 250 g of polyallylamine hydrochloride polymer solution was diluted with 337 g of water added in a 2 l, water-jacketed vessel fitted with a 45° pitched-blade turbine agitator and blanketed with nitrogen. The mixture was stirred at 200 rpm and the pH adjusted by the addition of 76.5 g of a 50 weight percent aqueous solution of sodium hydroxide to convert about 72 weight percent of the amine hydrochlorides to free amines. The resulting mixture was cooled to room temperature and the pH of the solution was determined to be 10.1. 600 g acetonitrile was added followed by addition of 11.8 g epichlorohydrin all at once. The agitation rate was increased to 500 rpm and the temperature controlled at 25° C. After 2 hours, the biphasic, liquid/liquid reaction dispersion changed into a gel/liquid dispersion. The reaction was allowed to continue for a total of 21 hours at room temperature after which time, the vessel was disassembled and the contents poured into a 3L, coarse-fritted filter funnel and vacuum filtered. 540 g of mother liquor was recovered having a conductivity of 2.3 mS/cm which was about 84% acetonitrile (75% recovery of acetonitrile) containing about 30 ppm epichlorohydrin and a large percentage of the allylamine. The resulting cross-linked PAA (680 g) isolated by filtration contained high levels of impurities (e.g., about 56 g sodium chloride, residual acetonitrile, unreacted allylamine, uncross-linked polyallylamine, etc.). To remove the impurities, the cross-linked PAA was washed 5 times by suspension in 5 of water, stirring magnetically for 30 minutes followed by filtering through a coarse-glass fritted, 3L funnel. The five, 5 l water washes yielded filtrates with conductivities of 16, 2.6, 0.4, 0.03 and 0.01 mS/cm, respectively. The washed polyallylamine (2250 g) was dried under vacuum at 60° C. yielding 105.5 g cross-linked polyallylamine. After cooling, the solids were ground with mortar and pestle.

Examples 1 to 4

Electrodeionization of an aqueous solution of $PAA_{HCl}$ to convert about 72 weight percent of the amine hydrochlorides to free amines was achieved by the method (EDI$_1$) described hereinabove. The charge necessary to neutralize the $PAA_{HCl}$ was calculated using Faraday's law:

$$0.72*1 \text{ eq/mol}*(122 \text{ g}*0.518 \text{ g/g }/93.56 \text{ g/mol})*96485 \text{ C/eq})/= 46924C$$

The controlled current was varied from 0.9 to 0.6 mA until 96.3 percent of the theoretical charge for a 72 percent coulometric neutralization was realized. The catholyte was washed out of the cell, weighed (204 g) and determined to have a pH of 9.80. The solution was determined to contain 20.8 percent solids by weight or 93 percent of the theoretical mass balance. An 86.4 g portion of the neutralized aqueous polyallylamine polymer solution was concentrated by flash evaporation at 70° C. to give 26.7 weight percent concentration of solids (67.3 g solution). Another 43.2 g portion of the neutralized aqueous polyallylamine polymer solution was concentrated by flash evaporation at 70° C. to give a 30.6 weight percent concentration of solids (29.4 g solution). The resulting reduced salt solutions, the 30.6 weight percent solution (Example 1), the 26.7 weight percent solution was divided in half (Examples 2 and 4), and the 20.8 weight percent solution (Example 3), were added to four 120 ml glass vessels such that each vessel contained 134 meq PAA. To each vessel the epichlorohydrin cross-linking agent was added all at once with stirring. The resulting mixtures were stirred until they gelled. Examples 1 to 4 were allowed to cure capped overnight at 80° C. The gels were dried under vacuum at 80° C. for 24 hours. After cooling, the solids were ground with mortar and pestle.

Examples 5 to 7

Electrodeionization of an aqueous solution of $PAA_{HCl}$ was achieved by the method described hereinabove. A constant controlled current of 0.5 mA was passed until 100 percent of the theoretical charge for a 72 percent coulometric neutralization was realized. The catholyte was washed out of the cell, weighed (211.9 g) and determined to have a pH of 9.90. The solution was determined to contain 16.89 percent solids by weight or 96.0 percent of the theoretical mass balance. The water from the EDI neutralized aqueous polyallylamine polymer solution was removed by flash evaporation at 70° C. and then water re-added to afford a 29.3 weight percent solids solution. To three 120 ml glass vessels (Examples 5 to 7) was added 30.7 g of the partially neutralized, reduced salt aqueous solution of polyallylamine polymer (134 meq). To each vessel the epichlorohydrin cross-linking agent was added all at once with stirring. The resulting mixtures were stirred until they gelled. Examples 5 to 7 were allowed to cure capped for 6 hours at 70° C. The gels were dried under vacuum at 80° C. overnight. After cooling, the solids were broken up with a spatula and ground in a four inch Retsch mill.

Example 8

250 g of polyallylamine hydrochloride polymer solution was diluted with 250 g of water in a 1000 ml vessel. The mixture was stirred and the pH adjusted by the addition of 76.5 g of a 50 weight percent aqueous solution of sodium hydroxide to convert about 72 weight percent of the amine hydrochlorides to free amines. One tenth of the resulting mixture (134 meq) was ultrafiltered ($UF_1$) as described hereinabove with an Amicon YM10 membrane with a concentration factor ($V_I/V_F$) of 6. The final filtrate conductivity was 0.12 millisiemens (mS). The aqueous solution of polyallylamine was washed out of the cell to give 102 g of solution with 7.57 weight percent solids or 83 percent theoretical yield. The water was removed by flash evaporation under vacuum at 70° C. The solid was reconstituted to a 31.0 percent solids solution by the addition of water. A portion of the reduced salt aqueous solution of the partially neutralized polyallylamine polymer (111 meq) was added to a 120 l glass vessel. Epichlorohydrin cross-linking agent was added all at once with stirring. The resulting mixture was stirred until it gelled. The reaction was allowed to proceed capped for 16 hours at 80° C. The gels were dried under vacuum at 80° C. for 72 hours. After cooling, the solids were broken up with a spatula and ground in a four inch Retsch mill.

Examples 9 to 11

Electrodeionization of an aqueous solution of $PAA_{HCl}$ was achieved by the method described hereinabove. The controlled current was varied from 0.9 to 0.2 mA until 100 percent of the theoretical charge for a 72 percent coulometric neutralization was realized. The catholyte was washed out of the cell, weighed (181.2 g) and determined to have a pH of 9.98. The solution was determined to contain 18.27 percent solids by weight or 94.0 percent of the theoretical mass balance. 63.8 g of the EDI neutralized aqueous polyallylamine polymer solution was ultrafiltered using a YM10 membrane (Examples 9, 171 meq) with a concentration factor ($V_I/V_F$) of 3. 44.3 g of the EDI neutralized aqueous polyallylamine polymer solution was ultrafiltered using a YM30 membrane (Examples 10, 120 meq) with a concentration factor ($V_I/V_F$) of 3. The aqueous solutions of polyallylamine polymer were concentrated to nominally 30 weight percent solids by flash evaporation at 70° C. The remaining EDI neutralized aqueous polyallylamine polymer solution was concentrated, without ultrafiltration, to 32.4 weight percent solids by flash evaporation at 70° C. and a 29.1 g (140 meq) sample used for Example 11. Each of the partially neutralized, reduced salt, aqueous solution of polyallylamine polymer were added to 120 ml glass vessels, the portion transferred for Example 9 contained 130 meq, Example 10 contained 81 meq, and Example 11 was transferred quantitatively and contained 140 meq of PAA. To each vessel the epichlorohydrin cross-linking agent was added all at once with stirring. The resulting mixtures were stirred until they gelled. Examples 9 to 11 were allowed to cure capped for 16 hours 80° C. The gels were dried under vacuum at 80° C. for 72 hours. After cooling, the solids were broken up with a spatula and ground in a four inch Retsch mill.

Examples 12 to 15

Electrodeionization of an aqueous solution of $PAA_{HCl}$ was achieved by the method described hereinabove. A constant controlled current of 0.9 mA was passed until 100 percent of the theoretical charge for a 72 percent coulometric neutralization was realized. The catholyte was washed out of the cell, weighed (253.2 g) and determined to have a pH of 9.98. The solution was determined to contain 17.3 percent solids by weight or 94.0 percent of the theoretical mass balance. Portions of the aqueous polyallylamine polymer solution were ultrafiltered using OSM-PW (Example 12, 167 meq), OSM-MX50 (Example 13, 156 meq), and DESAL-GM (Example 14, 161 meq) membranes with concentration factors ($V_I/V_F$) of 2.8, 4.2, and 3, respectively. The retenates nominally contained about 10 weight percent solids and were concentrated to between 28 to 30 weight percent solids by flash evaporation at 80° C. A portion of the aqueous polyallylamine polymer solution was concentrated, without ultrafiltration, to 30.8 weight percent solids by flash evaporation at 80° C. (Example 15, 125 meq). The reduced salt, aqueous solutions of polyallylamine polymer were added to 120 ml glass vessels, the portion transferred for Example 12 contained 107 meq, Example 13 contained 119 meq, Example 14 contained 137 meq and Example 15 was transferred quantitatively and contained 125 meq of PAA. To each vessel the epichlorohydrin cross-linking agent was added all at once with stirring. The resulting mixtures were stirred until they gelled. The reactions were allowed to cure capped for 12 hours 80° C. The gels were dried under vacuum at 80° C. for 16 hours. After cooling, the solids were broken up with a spatula and ground in a four inch Retsch mill.

TABLE 1

| EXAMPLE | EDI | | | | | UF | | | | PAA FLASH | | PAA |
|---|---|---|---|---|---|---|---|---|---|---|---|---|
| | Catholyte | Anolyte | I (mA) | % Q | Yield (%) | PAA (meq) | $V_I/V_F$ | Membrane | Pressure (psi) | Yield (%) | T(° C.) | % Solids | $NaCl_{PAA}$ (%) |
| A | | | | | | | | | | | | 13.5 | 35 |
| B | | | | | | | | | | | | 13.5 | 35 |
| C | | | | | | | | | | | | 13.5 | 35 |
| D | | | | | | | | | | | | 13.5 | 35 |
| E | | | | | | | | | | | | 13.5 | 35 |
| F | | | | | | | | | | | | 13.5 | 35 |
| G | | | | | | | | | | | | 23.9 | 35 |
| H | | | | | | | | | | | | 23.9 | 35 |
| I | | | | | | | | | | | | 14.4 | 35 |
| J | | | | | | | | | | | | 11.9 | 35 |
| K | | | | | | | | | | | | 23.9 | 35 |
| L | | | | | | | | | | | | 23.9 | 35 |
| M | | | | | | | | | | | | 14.4 | 35 |
| N | | | | | | | | | | | | 11.9 | 35 |
| O | | | | | | | | | | | | | 35 |
| 1 | 24% $PAA_{HCl}$ | 25% formate | 0.9 to 0.6 | 96.3 | 93.2 | | | | | | 70 | 30.6 | 0.35 |
| 2 | 24% $PAA_{HCl}$ | 25% formate | 0.9 to 0.6 | 96.3 | 93.2 | | | | | | 70 | 26.7 | 0.35 |
| 3 | 24% $PAA_{HCl}$ | 25% formate | 0.9 to 0.6 | 96.3 | 93.2 | | | | | | 70 | 20.8 | 0.35 |
| 4 | 24% $PAA_{HCl}$ | 25% formate | 0.9 to 0.6 | 96.3 | 93.2 | | | | | | 70 | 26.7 | 0.35 |
| 5 | 26% $PAA_{HCl}$ | 25% formate | 0.5 | 100 | 96 | | | | | | 70 | 29.3 | 0.35 |
| 6 | 26% $PAA_{HCl}$ | 25% formate | 0.5 | 100 | 96 | | | | | | 70 | 29.3 | 0.35 |
| 7 | 26% $PAA_{HCl}$ | 25% formate | 0.5 | 100 | 96 | | | | | | 70 | 29.3 | 0.35 |
| 8 | | | | | | 134 | 6 | YM10 | 50 | 83 | 70 | 31.0 | 0.3 |
| 9 | 26% $PAA_{HCl}$ | 25% formate | 0.9 to 0.2 | 100 | 94 | 171 | 3 | YM10 | 55 | 86 | 70 | 29.8 | 0.1 |
| 10 | 26% $PAA_{HCl}$ | 25% formate | 0.9 to 0.2 | 100 | 94 | 120 | 3 | YM30 | 55 | 82 | 70 | 31.7 | 0.1 |
| 11 | 26% $PAA_{HCl}$ | 25% formate | 0.9 to 0.2 | 100 | 94 | | | | | | 70 | 32.4 | 0.35 |
| 12 | 26% $PAA_{HCl}$ | 25% formate | 0.9 | 100 | 94 | 167 | 2.8 | PW | 50 | | 80 | 28 | 0.1 |
| 13 | 26% $PAA_{HCl}$ | 25% formate | 0.9 | 100 | 94 | 156 | 4.2 | MX50 | 50 | | 80 | 29 | 0.1 |
| 14 | 26% $PAA_{HCl}$ | 25% formate | 0.9 | 100 | 94 | 161 | 3 | GM | 50 | | 80 | 28.1 | 0.1 |
| 15 | 26% $PAA_{HCl}$ | 25% formate | 0.9 | 100 | 94 | | | | | | 80 | 30.8 | 0.35 |

TABLE 2

| EXAMPLE | $PAA_x$-REACTION | | | | | CURE | | DRY | | |
|---|---|---|---|---|---|---|---|---|---|---|
| | [PAA] (meq/g) | pH | meq | Epi (mol %) | Gel time (min) | T(° C.) | Time (hr) | T(° C.) | Time (hr) | Yield (%) |
| A | 2.01 | 10.2 | 134 | 4.78 | | rt | 15 | 90 | 24 | 89 |
| B | 2.01 | 10.2 | 134 | 7.16 | | rt | 15 | 90 | 24 | 90 |
| C | 2.01 | 10.2 | 134 | 9.55 | 26 | rt | 15 | 90 | 24 | 89 |
| D | 2.01 | 10.2 | 134 | 11.9 | | rt | 15 | 90 | 24 | 91 |
| E | 2.01 | 10.2 | 134 | 14.3 | | rt | 15 | 90 | 24 | 91 |
| F | 2.01 | 10.2 | 134 | 19.1 | | rt | 15 | 90 | 24 | 92 |
| G | 3.55 | 10.1 | 134 | 9.55 | | rt | 15 | 90 | 71 | |
| H | 3.55 | 10.1 | 134 | 11.9 | | rt | 15 | 90 | 71 | |
| I | 2.14 | 10.1 | 134 | 11.9 | | rt | 15 | 90 | 71 | |
| J | 1.78 | 10.1 | 134 | 11.9 | | rt | 15 | 90 | 71 | |
| K | 3.55 | 10.1 | 134 | 9.55 | | 70 | 15 | 90 | 71 | |
| L | 3.55 | 10.1 | 134 | 11.9 | | 70 | 15 | 90 | 71 | |
| M | 2.14 | 10.1 | 134 | 11.9 | | 70 | 15 | 90 | 71 | |
| N | 1.78 | 10.1 | 134 | 11.9 | | 70 | 15 | 90 | 71 | |
| O | 1.05 | 10.1 | 1340 | 9.55 | | rt | 19 | 60 | | |
| 1 | 4.55 | 9.8 | 134 | 9.55 | | 80 | overnight | 80 | 24 | |
| 2 | 3.97 | 9.8 | 134 | 9.55 | <8 | 80 | overnight | 80 | 24 | |
| 3 | 3.10 | 9.8 | 134 | 9.55 | | 80 | overnight | 80 | 24 | |
| 4 | 3.97 | 9.8 | 134 | 11.9 | | 80 | overnight | 80 | 24 | |
| 5 | 4.36 | 9.9 | 134 | 9.55 | | 70 | 6 | 80 | overnight | |
| 6 | 4.36 | 9.9 | 134 | 10.7 | | 70 | 6 | 80 | overnight | |
| 7 | 4.36 | 9.9 | 134 | 11.9 | | 70 | 6 | 80 | overnight | |
| 8 | 4.62 | | 111 | 9.55 | | 80 | 16 | 80 | 72 | |
| 9 | 4.43 | 9.98 | 130 | 9.55 | | 80 | 16 | 80 | 72 | |
| 10 | 4.72 | 9.98 | 81 | 9.55 | | 80 | 16 | 80 | 72 | |

TABLE 2-continued

| | PAA$_x$-REACTION | | | | | CURE | | DRY | | |
|---|---|---|---|---|---|---|---|---|---|---|
| EXAMPLE | [PAA] (meq/g) | pH | meq | Epi (mol %) | Gel time (min) | T(° C.) | Time (hr) | T(° C.) | Time (hr) | Yield (%) |
| 11 | 4.82 | 9.98 | 140 | 9.55 | | 80 | 16 | 80 | 72 | |
| 12 | 4.17 | 9.98 | 107 | 9.55 | | 80 | 12 | 80 | 16 | |
| 13 | 4.32 | 9.98 | 119 | 9.55 | | 80 | 12 | 80 | 16 | |
| 14 | 4.18 | 9.98 | 137 | 9.55 | | 80 | 12 | 80 | 16 | |
| 15 | 4.58 | 9.98 | 125 | 9.55 | | 80 | 12 | 80 | 16 | |

TABLE 3

| | NEUTRALIZATON | | UF | PAA$_x$-REACTION | | PAA$_x$-ANALYTICAL | | | |
|---|---|---|---|---|---|---|---|---|---|
| EXAMPLE | NaOH | EDI$_1$ | UF$_1$ | PAA (meq) | Epi (mol %) | NaCl$_{PAAx}$ (%) | SO (%) | Swell | PO$_4$ (meq/g) |
| A | X | | | 134 | 4.78 | 45 | 3.9 | 4.7 | 2.6 |
| B | X | | | 134 | 7.16 | 41 | 2.5 | 3.8 | 2.5 |
| C | X | | | 134 | 9.55 | 37 | 1.1 | 3.2 | 2.4 |
| D | X | | | 134 | 11.9 | 39 | 0.9 | 2.3 | 2.3 |
| E | X | | | 134 | 14.3 | 41 | 0.7 | 1.9 | 2.3 |
| F | X | | | 134 | 19.1 | 33 | 0.4 | 1.1 | 2.1 |
| G | X | | | 134 | 9.55 | 46 | 0.8 | 1.8 | 2.4 |
| H | X | | | 134 | 11.9 | 44 | 0.6 | 1.5 | 2.3 |
| I | X | | | 134 | 11.9 | 41 | 1.0 | 2.2 | 2.3 |
| J | X | | | 134 | 11.9 | 36 | 1.4 | 2.9 | 2.3 |
| K | X | | | 134 | 9.55 | 37 | 0.9 | 2.4 | 2.6 |
| L | X | | | 134 | 11.9 | 41 | 0.6 | 1.8 | 2.5 |
| M | X | | | 134 | 11.9 | 48 | 0.8 | 2.6 | 2.2 |
| N | X | | | 134 | 11.9 | 41 | 1.8 | 2.8 | 2.3 |
| O | X | | | 1340 | 9.55 | | | | |
| 1 | | X | | 134 | 9.55 | 2.1 | 2.4 | 5.7 | 3.2 |
| 2 | | X | | 134 | 9.55 | 1.4 | 1.2 | 3.1 | 3.1 |
| 3 | | X | | 134 | 9.55 | 1.2 | 1.7 | 3.9 | 3.1 |
| 4 | | X | | 134 | 11.9 | <0.5 | 0.7 | 2.3 | 2.6 |
| 5 | | X | | 134 | 9.55 | 1.4 | 1.1 | 3.1 | 3.1 |
| 6 | | X | | 134 | 10.7 | <0.5 | 0.7 | 2.8 | 3.1 |
| 7 | | X | | 134 | 11.9 | 1.3 | 0.5 | 2.5 | 3.1 |
| 8 | X | | X | 111 | 9.55 | <0.5 | 0.1 | 3.4 | 3.4 |
| 9 | | X | X | 130 | 9.55 | <0.5 | 0.2 | 3.5 | 3.2 |
| 10 | | X | X | 81 | 9.55 | <0.5 | 0.2 | 3.1 | 3.4 |
| 11 | | X | | 140 | 9.55 | 1.5 | 0.9 | 3.1 | 3.3 |
| 12 | | X | X | 107 | 9.55 | <0.5 | 0.1 | 4.5 | 3.3 |
| 13 | | X | X | 119 | 9.55 | <0.5 | 0.2 | 4.0 | 3.3 |
| 14 | | X | X | 137 | 9.55 | <0.5 | 0.4 | 3.9 | 3.3 |
| 15 | | X | | 125 | 9.55 | 0.8 | 1.0 | 3.2 | 3.2 |

Figure 2:
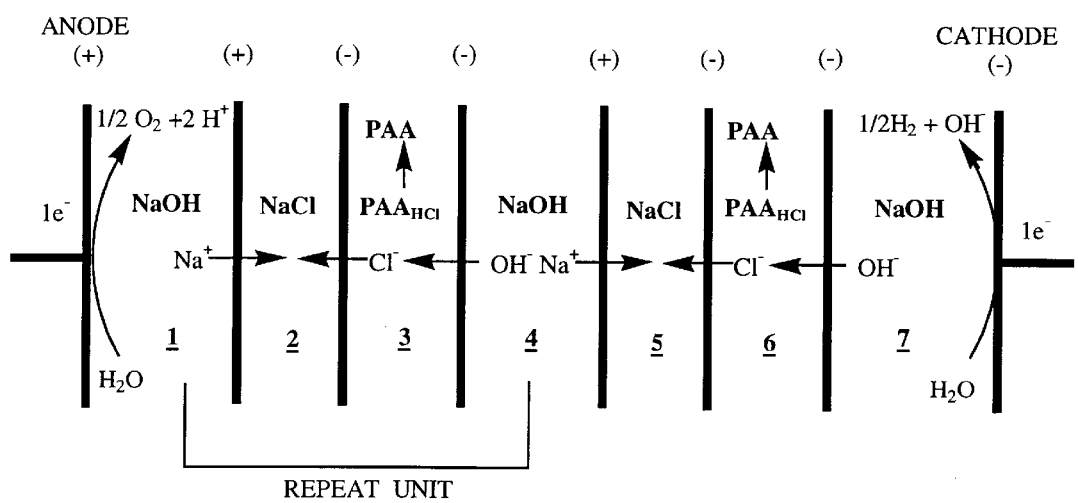
FIG. 2 is a schematic of an electrodeionization plate and frame cell stack with repeating units for neutralizing polyallylamine hydrochloride by the consumption of sodium hydroxide.

A summary of the electrodeionization and ultrafiltration conditions for Examples 16 to 28 the are summarized in Table 4. In Table 4:

"EDI$_2$" is an electrodeionization process used to neutralize the polyallylamine hydrochloride polymer in an EDI apparatus built from a commercially available cell stack (ElectroSyn-A/B Cell, from Electrosynthesis Co.). This plate and frame cell was operated with a 30 amp, 80 volt rectifier in a bipolar setup. The active electrode (and single membrane) area was 100 cm$^2$. The cell configuration is illustrated in FIG. 2. A stainless steel cathode and a nickel anode were used. Nafion cation exchange membranes (+) and Ionac MA3475 anion exchange membranes (−) were used.

Solutions from three 18.9 l vessels, each fitted with a centrifugal pump, were recirculated through the EDI cell. The anolyte, catholyte and NaOH were contained in one 18.9 l vessel ("V-1") and circulated concurrently through cell compartments 1, 4 and 7 (see FIG. 2). PAA$_{HCl}$ was in a different 18.9 l vessel ("V-2") and circulated concurrently through compartments 3 and 6. NaCl effluent was contained in the third 18.9 l vessel ("V-3") and circulated concurrently through compartments 2 and 5.

NaCl levels for the EDI$_2$ neutralized PAA were derived from the sodium content in the reduced salt, aqueous solutions of PAA (NaCl$_{PPA}$) as determined by ion selective electrode. NaCl levels are expressed as weight percent based on the weight of the partially neutralized polyallylamine polymer.

"UF$_2$" is an ultrafiltration process performed with a spiral-wound 2540, PW ultrafiltration element with a nominal 10,000 M$_w$-cutoff which was obtained from Osmonics. A 114 polypropylene reservoir was utilized with a Wilden pneumatic pump. A backpressure regulator was utilized on the feed-flow stream, after the element to regulate the feed pressure. A valve in the permeate output was used to regulate the permeate flow rate ("flux"). Operating conditions were set so the feed flow was 18.9 liters per minute ("lpm"). During ultrafiltration, the concentration of PAA was either (1) kept approximately constant (except for the small amount of low M$_w$ material passing through the membrane) by addition of water to the reservoir to make-up for the permeate loss ("con-add"), and/or (2) concentrated by not replenishing the permeate water loss ("concentrated"). For the examples where ultrafiltration is used, the amount of water added in the con-add mode is reported as kg water/kg PAA. The concentration of PAA in meq/g for the aqueous solution before ($PAA_{initial}$) and after ($PAA_{final}$) ultrafiltration are reported.

A summary of the cross-linking conditions for Examples 16 to 28 the are summarized in Table 5. In Table 5:

A stainless steel DiscoTherm B-6.3 LIST reactor manufactured by LIST Inc., was utilized for block gelation, curing and drying. "IPA WASH" is an isopropyl alcohol ("ipa") wash. To an isopropyl alcohol and water mixture in a 20 l glass vessel was added gel from the LIST reactor. The mixture was stirred mildly for 1 hour. The concentration of the supernatant was adjusted so that the isopropyl alcohol was about 60 to 80 percent, preferably about 69 percent by weight. Thereafter the IPA-wet gel was filtered on a glass-fritted Buchner funnel. This material was returned to the LIST reactor for drying.

A mini-plant L1A benchtop FitzMill obtained from Fitzpatrick Company was used to grind Examples 16 to 27. It was operated with a 35 mesh screen at 8715 rpm. A 125 gram portion of each dried polymer batch was ground and subsequently sieved with an 80 mesh screen. The oversize was reground, and this process repeated a total of six times so that >75% of the material passed through the 80 mesh screen.

A portion of the 125 gram sample was analyzed for sodium chloride, soluble oligomers, swell, and phosphate binding. The results are summarized in Table 6.

Examples 16

Electrodeionization of an aqueous solution of $PAA_{HCl}$ to convert about 72 weight percent of the amine hydrochlorides to free amines was achieved by the method described hereinabove wherein V-1 contained 16 kg water with 1.50 kg NaOH, V-2 contained 16.0 Kg water and 3.3 kg $PAA_{HCl}$ (50% solution), and V-3 was "seeded" with 100 g NaCl in 16 Kg water. Controlled current electrolyses (10.0 amps) were performed without temperature control. Current flow through the membranes and electrolytes resulted in resistive heating, which caused the temperature to climb from ambient to about 35° C. The deionization time was 17.7 hours. The PAA solution was determined to have a pH of 9.64, contain 1.80 meq/g PAA (92.5 percent of the theoretical mass balance), and contain 0.91 mg NaCl/g solution (0.75 weight percent NaCl in PAA). The resulting concentrated, reduced salt, aqueous solution of PAA was further concentrated to 4.36 meq/g under vacuum on a 10 l rotoevaporator at 52° C. 1.95 kg of the resulting solution was transferred to a LIST reactor. 891 g of deionized water was added to the solution followed by the addition of 77.2 g of epichlorohydrin. The reactor was held at 23° C. and the agitator spun at about 80 rpm until the point of gelation. The gel time was 23 minutes. Agitation was reduced to 20 rpm and the reaction was allowed to cure at 60° C. for 2.5 hours. The cross-linked polyallylamine was dried in the LIST reactor at 80° C. for 3 hours under 200 millimeters mercury ("mm Hg") vacuum and 2 more hours under 50 mm Hg vacuum yielding cross-linked polyallylamine polymer. A 125 g sample of $PAA_x$ was ground in a FitzMill grinder.

Example 17

$PAA_{HCL}$ was partially neutralized, concentrated, and cross-linked according to the procedure in Example 16. The deionization time was 18 hours. The solution was determined to have a pH of 9.65, contain 1.81 meq/g PAA (91.1 percent of the theoretical mass balance), and contain 0.68 mg NaCl/g solution (0.56 weight percent NaCl in PAA). The reduced salt, aqueous solution of PAA was concentrated to 5.80 meq/g under vacuum on a 10 l rotoevaporator at 52° C. 2.39 kg of the resulting solution was transferred to a LIST reactor. 771.6 g of deionized water was added to the solution followed by the addition of 123.2 g of epichlorohydrin. The reactor was held at 25° C. and the agitator spun at about 80 rpm until the point of gelation. The gel time was 9 minutes. Agitation was decreased to 20 rpm and the reaction was allowed to cure at 60° C. for 3 hours. The cross-linked polyallylamine was dried in the LIST reactor at 65° C. for 5.5 hours under 70 mm Hg vacuum yielding 787 g of cross-linked polyallylamine polymer. A 125 g sample of $PAA_x$ was ground in a FitzMill grinder.

Example 18

$PAA_{HCL}$ was partially neutralize by the procedure in Example 16 with a current of 7.5 amps. The deionization time was 24.6 hours. The solution was determined to have a pH of 9.90, contain 1.88 meq/g PAA (90.1 percent of the theoretical mass balance), and contain 0.58 mg NaCl/g solution (0.46 weight percent NaCl in PAA). 8.64 l of the resulting reduced salt, aqueous solution of PAA (16.25 equivalents ("eq") of PAA) was diluted to 87 l (0.187 meq of PAA/g solution) for ultrafiltration according to $UF_2$ procedure described hereinabove. The flux was set at 0.58 gpm and the temperature held constant at 17° C. The reduced salt, aqueous solution of PAA was concentrated to 0.99 meq/g (6.62 percent solids) over a period of 1.5 hours. The resulting concentrated, reduced salt, aqueous solution of PAA was further concentrated to 5.34 meq/g under vacuum on a 10 l rotoevaporator at 52° C. 1.96 kg of the resulting solution was transferred to a LIST reactor. 418.2 g of deionized water was added to the solution followed by the addition of 91.9 g of epichlorohydrin. The reactor was held at 20° C. and the agitator spun at about 80 rpm until the point of gelation. The gel time was 10 minutes. Agitation was reduced to 20 rpm and the reaction was allowed to cure at 60° C. for 3 hours. The cross-linked polyallylamine was dried in the LIST reactor at 80° C. for 8 hours under 200 mm Hg vacuum and 3 more hours under 25 mm Hg vacuum yielding 786 g cross-linked polyallylamine polymer. A 125 g sample of $PAA_x$ was ground in a FitzMill grinder.

Example 19

$PAA_{HCL}$ was partially neutralized by the procedure in Example 16. The deionization time was 17.6 hours. The solution was determined to have a pH of 9.69, contain 1.80 meq/g PAA (89.2 percent of the theoretical mass balance), and contain 0.56 mg NaCl/g solution (0.46 weight percent NaCl in PAA). The reduced salt, aqueous solution of PAA was concentrated to 5.06 meq/g under vacuum on a 10 l rotoevaporator at 77° C. 2.33 kg of the resulting solution was transferred to a LIST reactor. 355.5 g of deionized water was added to the solution followed by the addition of 104 g of epichlorohydrin. The reactor was held at 20° C. and the agitator spun at about 80 rpm until the point of gelation. The gel time was 13 minutes. Agitation was decreased to 20 rpm and the reaction was allowed to cure at 60° C. for 3 hours. 2.124 kg of the cross-linked polyallylamine polymer gel was washed with 3.5 kg of isopropyl alcohol and 893 g water to yield 1.804 kg IPA-wet gel which was dried in the LIST reactor at 80° C. for 3.5 hours under 20 mm Hg vacuum yielding 804.7 g of cross-linked polyallylamine polymer. A 125 g sample of $PAA_x$ was ground in a FitzMill grinder.

Example 20

Three batches of $PAA_{HCL}$ were partially neutralized by the procedure in Example 16. The deionization time for each batch averaged 17.6 hours. The combined solutions were determined to have an average pH of 9.85, contain and average of 1.83 meq/g PAA (90.7 percent of the theoretical mass balance), and contain 0.57 mg NaCl/g solution (0.46 weight percent NaCl in PAA). 26.7 1 of the resulting reduced salt, aqueous solution of PAA (48.72 eq of PAA) was diluted to 87 1 (0.56 meq of PAA/g solution) for ultrafiltration according to $UF_2$ procedure described hereinabove. The flux was set at 0.25 gpm and the temperature held constant at 40° C. The ultrafiltration was performed under the con-add mode for 6.5 hours during which time 113 kg water/kg PAA was added. The reduced salt, aqueous solution of PAA was then concentrated to 0.90 meq/g (6.04 percent solids) over a period of 2.8 hours. The resulting concentrated, reduced salt, aqueous solution of PAA was further concentrated to 6.22 meq/g under vacuum on a 10 l rotoevaporator at 52° C.

Example 21

1.673 kg of 6.22 meq/g PAA solution from Example 20 was transferred to a LIST reactor. 691 g of deionized water was added to the solution followed by the addition of 91.5 g of epichlorohydrin. The reactor was held at 20° C. and the agitator spun at about 80 rpm until the point of gelation. The gel time was 9 minutes. Agitation was intermittent at 20 rpm while the reaction cured at 60° C. for 3 hours. 2.278 kg of the cross-linked polyallylamine polymer gel was washed with 7.9 kg of isopropyl alcohol and 2.7 kg water to yield 1.995 kg IPA-wet gel which was dried in the LIST reactor at 80° C. for 3.5 hours under 50 mm Hg vacuum yielding 829.2 g of cross-linked polyallylamine polymer. A 125 g sample of $PAA_x$ was ground in a FitzMill grinder.

Example 22

1.169 kg of 6.22 meq/g PAA solution from Example 20 was transferred to a LIST reactor. 1.25 kg of deionized water was added to the solution followed by the addition of 64.2 g of epichlorohydrin. The reactor was held at 20° C. and the agitator spun at about 80 rpm until the point of gelation. The gel time was 25 minutes. Agitation was intermittent at 20 rpm while the reaction cured at 60° C. for 3 hours. 2.225 kg of the cross-linked polyallylamine polymer gel was washed with 5.0 kg of isopropyl alcohol and 1.0 kg water to yield 1.352 kg IPA-wet gel which was dried in the LIST reactor at 80° C. for 4 hours under 100 mm Hg vacuum yielding 520 g of cross-linked polyallylamine polymer. A 125 g sample of $PAA_x$ was ground in a FitzMill grinder.

Example 23

1.069 kg of 6.22 meq/g PAA solution from Example 20 was transferred to a LIST reactor. 1.59 kg of deionized water was added to the solution followed by the addition of 58.8 g of epichlorohydrin. The reactor was held at 20° C. and the agitator spun at about 80 rpm until the point of gelation. The gel time was 27 minutes. Agitation was intermittent at 20 rpm while the reaction cured at 60° C. for 3 hours. 2.47 kg of the cross-linked polyallylamine polymer gel was washed with 5.2 kg of isopropyl alcohol and 777 g water to yield 1.419 kg IPA-wet gel which was dried in the LIST reactor at 100° C. for 3.5 hours under 200 mm Hg vacuum yielding 476.3 g of cross-linked polyallylamine polymer. A 125 g sample of $PAA_x$ was ground in a FitzMill grinder.

Example 24

1.738 kg of 6.22 meq/g PAA solution from Example 20 was transferred to a LIST reactor. 717 g of deionized water was added to the solution followed by the addition of 95.4 g of epichlorohydrin. The reactor was held at 20° C. and the agitator spun at about 80 rpm until the point of gelation. The gel time was 10 minutes. Agitation was decreased to 20 rpm while the reaction cured at 60° C. for 3 hours. 2.33 kg of the cross-linked polyallylamine polymer gel was washed with 8.6 kg of isopropyl alcohol and 3.1 kg water to yield 2.05 kg IPA-wet gel which was dried in the LIST reactor at 60° C. at 200 mm Hg for 3.5 hours, 60° C. at 100 mm Hg vacuum for 1 hour, 80° C. at 50 mm Hg vacuum for 1 hour and 80° C. at 25 mm Hg vacuum for 1 hour yielding 687.8 g of cross-linked polyallylamine polymer. A 125 g sample of $PAA_x$ was ground in a FitzMill grinder.

Example 25

2.06 kg of 50 percent solution $PAA_{HCL}$ was added to 87 1 of water and neutralized with 636 g of 50 percent sodium hydroxide. The resulting aqueous solution of PAA (11.04 eq of PAA, 0.13 meq of PAA/g solution) was ultrafiltered according to $UF_2$ procedure described hereinabove. The flux was set at 0.53 gpm and the temperature held constant at 23° C. The ultrafiltration was performed under the con-add mode for 3 hours during which time 486 kg water/kg PAA was added. The reduced salt, aqueous solution of PAA was then concentrated to 0.78 meq/g (5.26 percent solids) over a period of 2.5 hours. The resulting concentrated, reduced salt, aqueous solution of PAA was further concentrated to 5.29 meq/g under vacuum on a 10 l rotoevaporator at 52° C. 1.38 kg of the resulting solution was transferred to a LIST reactor. 279 g of deionized water was added to the solution followed by the addition of 64.9 g of epichlorohydrin. The reactor was held at 20° C. and the agitator spun at about 80 rpm until the point of gelation. The gel time was 11 minutes. Agitation was reduced to 20 rpm and the reaction was allowed to cure at 60° C. for 3 hours. The cross-linked polyallylamine was dried in the LIST reactor at 80° C. for 2 hours under 20 mm Hg vacuum yielding 572 g cross-linked polyallylamine polymer. A 125 g sample of $PAA_x$ was ground in a FitzMill grinder.

Example 26

7.76 kg of 50 percent solution $PAA_{HCL}$ was added to 87 1 of water and neutralized with 2.39 kg of 50 percent sodium hydroxide. The resulting aqueous solution of PAA (41.47 eq of PAA, 0.47 meq of PAA/g solution) was ultrafiltered according to $UF_2$ procedure described hereinabove. The flux was set at 0.29 gpm and the temperature held constant at 23° C. The ultrafiltration was performed under the con-add mode for 5 hours during which time 118 kg water/kg PAA was added. The reduced salt, aqueous solution of PAA was then concentrated to 0.79 meq/g (5.28 percent solids) over a period of 8.5 hours. The resulting concentrated, reduced salt, aqueous solution of PAA was further concentrated to 6.92 meq/g under vacuum on a 10 l rotoevaporator at 54° C.

Example 27

1.557 kg of the 6.92 meq/g reduced salt, aqueous solution of PAA from Example 26 was transferred to a LIST reactor.

890 g of deionized water was added to the solution followed by the addition of 95.5 g of epichlorohydrin. The reactor was held at 20° C. and the agitator spun at about 80 rpm until the point of gelation. The gel time was 11 minutes. Agitation was reduced to 20 rpm while the reaction cured at 60° C. for 3 hours. The cross-linked polyallylamine was dried in the LIST reactor at 80° C. for 5 hours under 30 mm Hg vacuum yielding 876 g cross-linked polyallylamine polymer. A 125 g sample of $PAA_x$ was ground in a FitzMill grinder.

Example 28

1.550 kg of the 6.92 meq/g reduced salt, aqueous solution of PAA from Example 26 was transferred to a LIST reactor. 887 g of deionized water was added to the solution followed by the addition of 94.9 g of epichlorohydrin. The reactor was held at 10° C. and the agitator spun at about 80 rpm until the point of gelation. The gel time was 25 minutes. Agitation was reduced to 20 rpm while the reaction cured at 60° C. for 3 hours. The cross-linked polyallylamine was dried in the LIST reactor at 80° C. for 2.5 hours under 20 mm Hg vacuum yielding 836 g cross-linked polyallylamine polymer. A 125 g sample of $PAA_x$ was ground in a FitzMill grinder.

Example 29

1.490 kg of the 6.92 meq/g reduced salt, aqueous solution of PAA from Example 26 was transferred to a LIST reactor. 1.09 kg of deionized water was added to the solution followed by the addition of 91.1 g of epichlorohydrin. The reactor was held at 20° C. and the agitator spun at about 80 rpm until the point of gelation. The gel time was 13 minutes. Agitation was reduced to 20 rpm while the reaction cured at 60° C. for 3 hours. The cross-linked polyallylamine was dried in the LIST reactor at 80° C. for 4 hours under 20 mm Hg vacuum yielding 823 g cross-linked polyallylamine polymer. A 125 g sample of $PAA_x$ was ground in a FitzMill grinder.

TABLE 4

| EXAMPLE | $EDI_2$ | | | | | $UF_2$ | | | | | | | PAA | |
|---|---|---|---|---|---|---|---|---|---|---|---|---|---|---|
| | $PAA_{HCl}$ (meq/g) | Time (hr) | I (A) | pH | Yield (%) | $PAA_{initial}$ (meq/g) | Flux (gpm) | T(° C.) | Con-add Water (kg) | Con-Add Time (hr) | Concentrate Time (hr) | $PAA_{final}$ (meq/g) | FLASH T(° C.) | $NaCl_{PAA}$ (%) |
| 16 | 5.51 | 17.7 | 10 | 9.64 | 92.5 | | | | | | | | 52 | 0.75 |
| 17 | 5.51 | 18 | 10 | 9.65 | 91.1 | | | | | | | | 52 | 0.56 |
| 18 | 5.51 | 24.6 | 7.5 | 9.90 | 90.1 | 0.187 | 0.58 | 17 | | | 1.5 | 0.99 | 52 | |
| 19 | 5.51 | 17.6 | 10 | 9.69 | 89.2 | | | | | | | | 77 | 0.46 |
| 20 | 5.51 | 17.6 | 10 | 9.85 | 90.7 | 0.56 | 0.25 | 40 | 113 | 6.5 | 2.8 | 0.90 | 52 | |
| 25 | | | | | | 0.13 | .53 | 23 | 486 | 3 | 2.5 | 0.78 | 52 | |
| 26 | | | | | | 0.47 | .29 | 23 | 118 | 5 | 8.5 | 0.79 | 54 | |

TABLE 5

| EXAMPLE | $PAA_x$-REACTION | | | | | CURE | | | IPA WASH | DRY | | | | |
|---|---|---|---|---|---|---|---|---|---|---|---|---|---|---|
| | [PAA] (meq/g) | [PAA] (eq) | Epi (mol %) | T(° C.) | Gel time (min) | T(° C.) | rpm | Time (hr) | Ipa/water (kg/kg) | T(° C.) | Time (hr) | mm Hg | Yield (g) |
| 16 | 4.36 | 8.5 | 9.80 | 23 | 23 | 60 | 20 | 2.5 | | 80 | 3/2 | 200/50 | |
| 17 | 5.8 | 13.9 | 9.57 | 25 | 9 | 60 | 20 | 3 | | 65 | 5.5 | 70 | 787 |
| 18 | 5.34 | 10.5 | 9.50 | 20 | 10 | 60 | 20 | 3 | | 80 | 8/3 | 200/25 | 786 |
| 19 | 5.06 | 11.8 | 9.55 | 20 | 13 | 60 | 20 | 3 | 3.5/0.893 | 80 | 3.5 | 20 | 804.7 |
| 21 | 6.22 | 10.4 | 9.51 | 20 | 9 | 60 | 20/intermittent | 3 | 7.9/2.7 | 80 | 3.5 | 50 | 829.2 |
| 22 | 6.22 | 7.3 | 9.55 | 20 | 25 | 60 | 20/intermittent | 3 | 5/1 | 80 | 4 | 100 | 520 |
| 23 | 6.22 | 6.7 | 9.56 | 20 | 27 | 60 | 20/intermittent | 3 | 5.2/.777 | 100 | 3.5 | 200 | 476.3 |
| 24 | 6.22 | 10.8 | 9.54 | 20 | 10 | 60 | 20 | 3 | 8.6/3.1 | 60/60/80/80 | 3.5/1/1/1 | 200/1050/50/2 | 687.8 |
| 25 | 5.29 | 7.3 | 9.60 | 20 | 11 | 60 | 20 | 3 | | 80 | 2 | 20 | 572 |
| 27 | 6.92 | 10.8 | 9.59 | 20 | 11 | 60 | 20 | 3 | | 80 | 5 | 30 | 876 |
| 28 | 6.92 | 10.7 | 9.57 | 10 | 25 | 60 | 20 | 3 | | 80 | 2.5 | 20 | 836 |
| 29 | 6.92 | 10.3 | 9.55 | 20 | 13 | 60 | 20 | 3 | | 80 | 4 | 20 | 823 |

TABLE 6

| EXAMPLE | NEUTRALIZATION | UF | | $PAA_x$-REACTION | | IPA WASH | $PAA_x$-ANALYTICAL | | | |
|---|---|---|---|---|---|---|---|---|---|---|
| | NaOH | $EDI_2$ | $UF_2$ | PAA (eq) | Epi (mol %) | IPA | $NaCl_{PAAX}$ (%) | SO (%) | Swell | $PO_4$ (meq/g) |
| 16 | | X | | 8.5 | 9.80 | | 4.8 | 2.1 | 5.2 | 3.6 |
| 17 | | X | | 13.9 | 9.57 | | 0.8 | 1.6 | 3.4 | 3.7 |
| 18 | | X | X | 10.5 | 9.50 | | 0.7 | 0.2 | 3.6 | 3.7 |
| 19 | | X | X | 11.8 | 9.55 | X | <0.5 | 0.3 | 3.2 | 3.6 |
| 21 | | X | X | 10.4 | 9.51 | X | <0.5 | 0.1 | 3 | 3.7 |
| 22 | | X | X | 7.3 | 9.55 | X | <0.5 | 0.1 | 5.3 | 3.6 |

TABLE 6-continued

| EXAMPLE | NEUTRALIZATION NaOH | EDI$_2$ | UF UF$_2$ | PAA$_X$-REACTION PAA (eq) | Epi (mol %) | IPA WASH IPA | PAA$_X$-ANALYTICAL NaCl$_{PAAX}$ (%) | SO (%) | Swell | PO$_4$ (meq/g) |
|---|---|---|---|---|---|---|---|---|---|---|
| 23 |  | X | X | 6.7 | 9.56 | X | <0.5 | 0.1 | 6.5 | 3.6 |
| 24 |  | X | X | 10.8 | 9.54 | X | <0.5 | 0.1 | 3.4 | 3.5 |
| 26 | X |  | X | 7.3 | 9.60 |  | <0.5 | 0.1 | 3.4 | 3.5 |
| 28 | X |  | X | 10.8 | 9.59 |  | <0.5 | 0.1 | 3.3 | 3.8 |
| 29 | X |  | X | 10.7 | 9.57 |  | <0.5 | 0.1 | 3.1 | 3.8 |
| 30 | X |  | X | 10.3 | 9.55 |  | 2.3 | 0.1 | 3.5 | 3.7 |

What is claimed is:

1. A process for producing a cross-linked polyallylamine polymer comprising the step of reacting a reduced salt, aqueous solution of a polyallylamine polymer with a multifunctional cross-linking agent in a LIST reactor to give a cross-linked polyallylamine polymer.

2. The process of claim 1 further comprising the step of partially neutralizing an aqueous solution of polyallylamine hydrochloride polymer by ion exchange or electrodeionization to give the reduced salt, aqueous solution of polyallylamine polymer.

3. The process of claim 2 further comprising the step of nanofiltering or ultrafiltering the reduced salt, aqueous solution of polyallylamine polymer.

4. The process of claim 2 further comprising the step of ultrafiltering the reduced salt, aqueous solution of polyallylamine polymer.

5. The process of claim 1 further comprising the step of partially neutralizing an aqueous solution of polyallylamine hydrochloride polymer by electrodeionization to give the reduced salt, aqueous solution of polyallylamine polymer.

6. The process of claim 5 further comprising the step of nanofiltering or ultrafiltering the reduced salt, aqueous solution of polyallylamine polymer.

7. The process of claim 5 further comprising the step of ultrafiltering the reduced salt, aqueous solution of polyallylamine polymer.

8. The process of claim 1 further comprising the steps of:
   (a) partially neutralizing an aqueous solution of polyallylamine hydrochloride polymer with a base and
   (b) ultrafiltering the partially neutralized, aqueous solution of polyallylamine polymer to give the reduced salt, aqueous solution of polyallylamine polymer.

9. The process of claim 8 wherein the base is sodium hydroxide.

10. The process of claim 1 further comprising the step of concentrating the reduced salt, aqueous solution of polyallylamine polymer.

11. The process of claim 1 further comprising the step of washing the cross-linked polyallylamine polymer with an alcohol or alcohol/water solution.

12. The process of claim 1 further comprising the step of drying the cross-linked polyallylamine polymer.

13. The process of claim 1 further comprising the step of drying the cross-linked polyallylamine polymer under reduced pressure.

14. The process of claim 1 further comprising the step of grinding and sieving the cross-linked polyallylamine polymer.

15. A process for producing a cross-linked polyallylamine polymer comprising the steps of:
   (a) partially neutralizing an aqueous solution of polyallylamine hydrochloride polymer with sodium hydroxide,
   (b) ultrafiltering the partially neutralized, aqueous solution of polyallylamine polymer to give a reduced salt, aqueous solution of polyallylamine polymer,
   (c) concentrating the reduced salt, aqueous solution of polyallylamine polymer,
   (d) reacting the reduced salt, aqueous solution of polyallylamine polymer with epichlorohydrin in a LIST reactor to give a cross-linked polyallylamine polymer,
   (e) drying the a cross-linked polyallylamine polymer in a LIST reactor,
   (f) grinding and sieving the cross-linked polyallylamine polymer, and
   (g) isolating the cross-linked polyallylamine polymer.

16. The process of claim 1 wherein the cross-linking agent is present in an amount from about 0.1 to about 75 weight percent based on the combined weight of polymer and cross-linking agent.

17. The process of claim 1 wherein the cross-linking agent is present in an amount from about 2 to about 20 weight percent based on the combined weight of polymer and cross-linking agent.

18. The process of claim 1 wherein the cross-linking agent is selected from the group of acrylol chloride, epichlorohydrin, butanedioldiglycidyl ether, or ethanedioldiglycidyl ether.

19. The process of claim 1 wherein the cross-linking agent is epichlorohydrin.

20. The process of claim 11 wherein the alcohol is selected from the group of ethyl alcohol, n-propanol, or isopropyl alcohol.

21. The process of claim 11 wherein the alcohol is isopropyl alcohol.

* * * * *